(12) United States Patent
Santavicca et al.

(10) Patent No.: US 11,483,320 B2
(45) Date of Patent: Oct. 25, 2022

(54) SYSTEM AND METHOD FOR DETECTING ACTIVE RELAY STATION ATTACKS BETWEEN TWO MULTIMEDIA COMMUNICATION PLATFORMS (71) Applicant: VOXX INTERNATIONAL CORPORATION, Hauppauge, NY (US)

(72) Inventors: Joseph Anthony Santavicca, Macomb, MI (US); Tristen Kyle Pierson, Rochester, MI (US); Antonio Fominaya, Kissimmee, FL (US)

(73) Assignee: VOXX INTERNATIONAL CORPORATION, Hauppauge, NY (US)

(*) Notice: Subject to any disclaimer, the term of this patent is extended or adjusted under 35 U.S.C. 154(b) by 156 days.

(21) Appl. No.: 16/826,612

(22) Filed: Mar. 23, 2020

(65) Prior Publication Data
US 2020/0304527 A1 Sep. 24, 2020

Related U.S. Application Data (60) Provisional application No. 62/822,321, filed on Mar. 22, 2019.

(51) Int. Cl.
*H04L 29/06* (2006.01)
*H04L 9/32* (2006.01)
(Continued)

(52) U.S. Cl.
CPC ........ *H04L 63/1416* (2013.01); *H04L 9/3271* (2013.01); *H04L 63/18* (2013.01);
(Continued)

(58) Field of Classification Search
CPC ............ H04L 2209/08; H04L 2209/84; H04L 63/1416; H04L 63/18; H04L 9/3271;
(Continued)

(56) References Cited

U.S. PATENT DOCUMENTS

7,783,451 B2 * 8/2010 Wilcox ................. G01S 13/825
702/158
9,386,181 B2 * 7/2016 Fucci ...................... H04L 69/28
(Continued)

*Primary Examiner* — Gary S Gracia
(74) *Attorney, Agent, or Firm* — Allen, Dyer, Doppelt, + Gilchrist, P.A.

(57) ABSTRACT

A method for detecting relay attacks between two communication platforms, the method including: receiving, at a first communication platform, a first signal sent via a first communication channel from a second communication platform, the first signal including information about a challenge; receiving, at the first communication platform, a second signal sent via a second communication channel from the second communication platform, the second signal being a start clock; receiving, at the first communication platform, a third signal sent via the second communication channel from the second communication platform, the third signal including the challenge; outputting, from the first communication platform, a response to the challenge via the first communication channel to the second communication platform; and determining, at the second communication platform, whether a relay attack has occurred based on a time elapsed from when the start clock began to when the response is received at the second communication platform.

13 Claims, 4 Drawing Sheets

(51) Int. Cl.
*H04L 9/40* (2022.01)
*H04W 12/121* (2021.01)
(52) U.S. Cl.
CPC ....... *H04W 12/121* (2021.01); *H04L 2209/08* (2013.01); *H04L 2209/84* (2013.01)
(58) Field of Classification Search
CPC .... H04L 9/002; H04L 9/3215; H04W 12/121; H04W 12/122
See application file for complete search history.

(56) References Cited

U.S. PATENT DOCUMENTS

| | | | | |
|---|---|---|---|---|
| 9,794,753 | B1* | 10/2017 | Stitt | G06F 21/31 |
| 9,800,610 | B1* | 10/2017 | Lu | H04W 12/128 |
| 10,055,919 | B2* | 8/2018 | Asmar | B60R 25/04 |
| 10,576,933 | B2* | 3/2020 | Weghaus | H04W 12/06 |
| 2006/0083406 | A1* | 4/2006 | Ishimura | G01S 13/84 |
| | | | | 382/106 |
| 2006/0094350 | A1* | 5/2006 | Ishimura | G01S 13/78 |
| | | | | 342/127 |
| 2006/0273888 | A1* | 12/2006 | Yamamoto | B60R 25/24 |
| | | | | 340/426.36 |
| 2009/0257752 | A1* | 10/2009 | Yeh | H04L 47/762 |
| | | | | 398/115 |
| 2010/0117899 | A1* | 5/2010 | Papadimitratos | G01S 19/20 |
| | | | | 342/357.62 |
| 2014/0240088 | A1* | 8/2014 | Robinette | G08B 21/0219 |
| | | | | 340/5.61 |
| 2014/0330449 | A1* | 11/2014 | Oman | B60R 25/01 |
| | | | | 701/2 |
| 2015/0222658 | A1* | 8/2015 | Kim | H04W 12/12 |
| | | | | 726/22 |
| 2015/0302673 | A1* | 10/2015 | Seiberts | G07C 9/00309 |
| | | | | 340/5.61 |
| 2015/0310234 | A1* | 10/2015 | Janssens | H04L 63/1475 |
| | | | | 340/10.4 |
| 2016/0182548 | A1* | 6/2016 | Ghabra | H04L 63/107 |
| | | | | 726/23 |
| 2016/0225203 | A1* | 8/2016 | Asmar | G07C 9/00309 |
| 2016/0234008 | A1* | 8/2016 | Hekstra | H04W 4/80 |
| 2016/0332597 | A1* | 11/2016 | Tokunaga | G08C 17/02 |
| 2016/0332598 | A1* | 11/2016 | Ghabra | B60R 25/245 |
| 2017/0006048 | A1* | 1/2017 | Garrett | H04L 9/0841 |
| 2017/0008488 | A1* | 1/2017 | Matsumoto | B60R 25/31 |
| 2017/0190316 | A1* | 7/2017 | Kim | H04W 12/06 |
| 2017/0232931 | A1* | 8/2017 | Fernando | B60R 25/241 |
| | | | | 701/2 |
| 2017/0286966 | A1* | 10/2017 | Kohli | G06Q 20/407 |
| 2017/0346852 | A1* | 11/2017 | Chhabra | H04W 12/64 |
| 2018/0007078 | A1* | 1/2018 | Motos | H04W 56/001 |
| 2018/0099640 | A1* | 4/2018 | Ludger | B60R 25/245 |
| 2018/0099643 | A1* | 4/2018 | Golsch | H04W 4/30 |
| 2018/0103414 | A1* | 4/2018 | Golsch | G07C 9/00309 |
| 2018/0162321 | A1* | 6/2018 | Spiess | G07C 9/00309 |
| 2018/0178758 | A1* | 6/2018 | Yamaguchi | G07C 9/20 |
| 2018/0232971 | A1* | 8/2018 | Schieke | H04L 63/0861 |
| 2018/0292522 | A1* | 10/2018 | Cavendish | H04L 9/3297 |
| 2020/0020184 | A1* | 1/2020 | Noll | G07C 9/00309 |
| 2020/0327752 | A1* | 10/2020 | Okada | B60R 25/1001 |

* cited by examiner

SYSTEM AND METHOD FOR DETECTING ACTIVE RELAY STATION ATTACKS BETWEEN TWO MULTIMEDIA COMMUNICATION PLATFORMS

CROSS-REFERENCE TO RELATED APPLICATION

This application claims priority under 35 U.S.C. § 119/120 to U.S. provisional application No. 62/822,321, filed on Mar. 22, 2019 in the U.S. Patent and Trademark Office, the disclosure of which is incorporated by reference herein in its entirety.

TECHNICAL FIELD

The present invention relates to techniques for preventing relay attacks.

DISCUSSION OF THE RELATED ART

Given a well-understood, encrypted communication method between two communication platforms, a single-medium connection methodology is vulnerable to "Relay Attacks" through various methods.

Standard methods for foiling these attacks on single-medium systems rely on either Time of Flight or other distance bounding methods within that medium. Time of Flight relies on significant precision and accuracy of real time passage on the order of nanoseconds. As a stand-alone solution, this is currently unrealistic in mass-produced smart devices. Effective distance bounding relies on highly precise hardware that is currently unavailable in mass-produced smart devices.

SUMMARY OF THE INVENTION

According to an exemplary embodiment of the present invention, a method for detecting relay attacks between two communication platforms includes: receiving, at a first communication platform, a first signal sent via a first communication channel from a second communication platform, the first signal being encrypted and including information about where to retrieve a challenge; receiving, at the first communication platform, a second signal sent via a second communication channel from the second communication platform, wherein the second signal is a start clock; receiving, at the first communication platform, a third signal sent via the second communication channel from the second communication platform, the third signal including the challenge; outputting, from the first communication platform, a response to the challenge via the first communication channel to the second communication platform, wherein the response is encrypted; and determining, at the second communication platform, whether a relay attack has occurred based on a time elapsed from when the start clock began to when the response is received at the second communication platform.

The second communication platform determines that the relay attack has occurred when the time elapsed from when the start clock began to when the response is received at the second communication platform exceeds a predetermined threshold.

The second communication platform determines that the relay attack has not occurred when the time elapsed from when the start clock began to when the response is received at the second communication platform is below a predetermined threshold.

The information about where to retrieve the challenge includes a frequency of the challenge.

The third signal is transmitted with cryptographically random noise.

The first communication platform is a hand-held device and the second communication platform is a vehicle equipped with a microlocation system.

The hand-held device is a smartphone or a key fob.

The first and second communication platforms transmit and receive data via the first communication channel using Bluetooth or WiFi frequencies.

The first communication platform transmits data to the second communication platform via the second communication channel using ultra-wideband frequencies.

According to an exemplary embodiment of the present invention, a method for detecting relay attacks between two communication devices includes: receiving, at a first communication device, a first signal sent via a first communication channel from a second communication device, the first signal including information about a challenge; receiving, at the first communication device, a second signal sent via a second communication channel from the second communication device, wherein the second signal is a start clock; receiving, at the first communication device, a third signal sent via the second communication channel from the second communication device, the third signal including the challenge; outputting, from the first communication device, a response to the challenge via the first communication channel to the second communication device; and determining, at the second communication device, whether a relay attack has occurred based on a time elapsed from when the start clock began to when the response is received at the second communication device.

The second communication device determines that the relay attack has occurred when the time elapsed from when the start clock began to when the response is received at the second communication device exceeds a threshold.

When it is determined that the relay attack has occurred, the second communication device ignores the response sent from the first communication device.

The first and second communication channels are wireless communication channels.

DETAILED DESCRIPTION OF EXEMPLARY EMBODIMENTS

Figure 1:
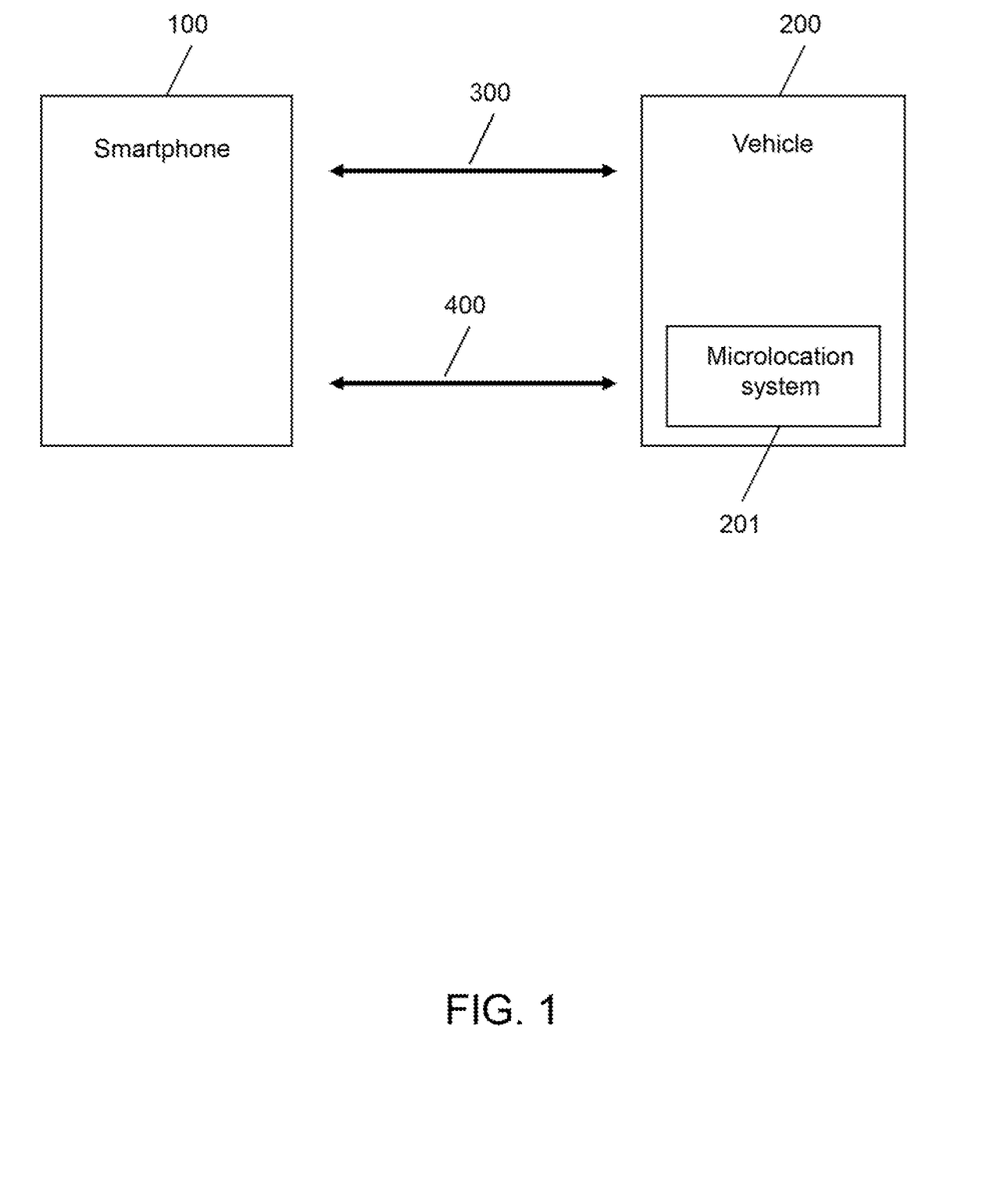
FIG. 1 illustrates a system according to an exemplary embodiment of the present invention.

FIG. 1 illustrates a system according to an exemplary embodiment of the present invention.

As shown in FIG. 1, there are two connected communication platforms 100 and 200 capable of communicating through at least two different media 300 and 400. At least one of the media 300 is capable of bidirectional, encrypted communication (e.g., Bluetooth Low Energy (BLE). A secondary media 400 is capable of unidirectional, unencrypted communication requiring tuning to a signal (e.g., any radio frequency (RF) signal). The secondary media 400 may also be bidirectional. In addition, encrypted data may be transmitted via the secondary media 400.

More specifically, FIG. 1 shows a first communication platform 100, which may be a smartphone or a key fob, and a second communication platform 200, which may be vehicle equipped with a microlocation system. It is to be understood, however, that the first and second communication platforms 100 and 200 may be any number of computing devices including but not limited to a tablet personal computer (PC), a laptop computer, a desktop computer, a smartwatch, an e-reader, a hand-held gaming console, etc.

The first communication media 300 may refer to a wireless transmission frequency band. Examples of this band include, but are not limited to: a) Bluetooth; b) WiFi (2 GHz); c) WiFi (5 GHz); and d) any signal over 5 KHz. The second communication media 400 may refer to a wireless frequency band. Examples of this band, include, but are not limited to: a) 100-150 KHz (low frequency (LF) coils emitting radiation picked up by a magnetometer may be used in this range); b) 3.1-10.6 GHz (an Ultra-Wideband (UWB) transmitter received by a UWB receiver or other appropriate antenna may be used in this range); and c) 20-60 Hz (e.g., Ultrasonic sub-bass frequencies).

Hereinafter, for convenience of description, the first communication platform 100 is assumed to be a smartphone and the second communication platform 200 is assumed to be a vehicle equipped with a microlocation system. It is to be understood, however, that the present invention is not limited thereto.

As noted, the first communication platform 100 may be a smartphone. As such, the first communication platform 100 may include, but is not limited to, a long-range radio frequency RE transceiver, a short-range Bluetooth transceiver, a memory, a central processing unit, a display, etc. The smartphone may function as a smart key that can be used to unlock, lock and start the vehicle.

The second communication platform 200 may be a vehicle equipped with a microlocation system 201. The microlocation system 201 may include, but is not limited to, a plurality of BLE beacons positioned within the vehicle. These beacons are small transmitters whose signals can be detected by the smartphone. It is to be understood, however, that other micro-location technologies may be used such as WiFi, Quick Response (QR) codes, Zigbee, etc.

In an example operation, the beacons advertise an ID (e.g., a vehicle specific code and mounting location—such as left door or rear bumper, etc.). After an initial connection is made, the smartphone collates received signal strength indicator (RSSI) data between itself and the beacons and sends this information to the control module of the microlocation system. The control module may then process this information and determine the phone's location (e.g., near the right of the vehicle, near the left of the vehicle, near the rear of the vehicle, inside the vehicle or approaching the vehicle).

Through the microlocation system 201, if the smartphone is within a predetermined range of the vehicle and this information is provided to the control module, currently locked doors may be automatically unlocked. In addition, if the smartphone is within the predetermined range, the vehicle may be automatically started by the control module providing an instruction to a remote start system installed in the vehicle.

An exemplary microlocation system is described in U.S. Pat. No. 10,075,819, entitled "System and method for micro-locating and communicating with a portable vehicle control device," issued Sep. 11, 2018, the disclosure of which is incorporated by reference herein in its entirety.

Hereinafter, a method for detecting a relay attack between the two communication platforms 100 and 200 will be described.

Figure 2A:
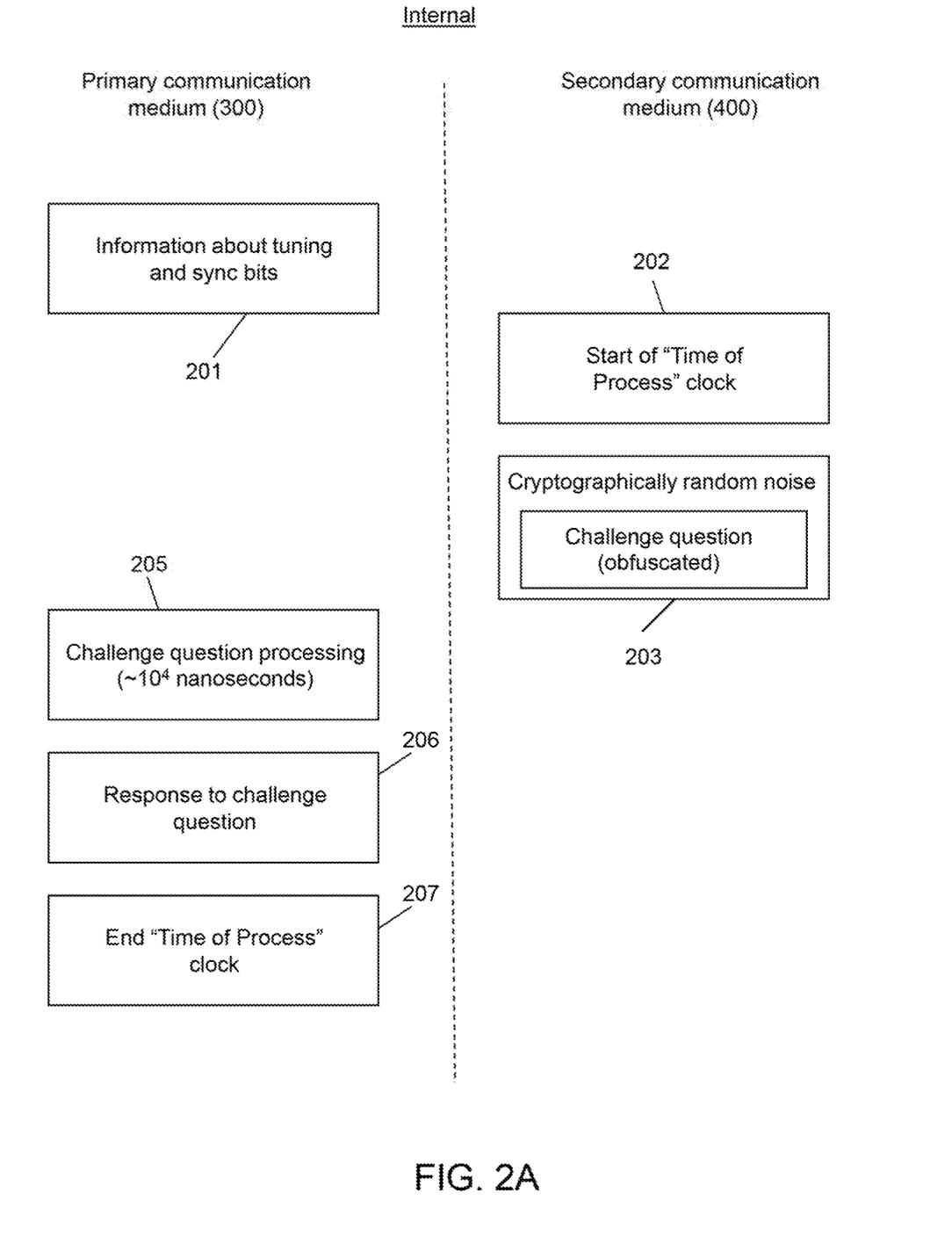
FIG. 2A is a workflow diagram of an internal system according to an exemplary embodiment of the present invention.

FIG. 2A is a workflow diagram of an internal system according to an exemplary embodiment of the present invention. The left side of FIG. 2A shows communications over the primary or first communication media (medium) 300 while the right side of FIG. 2A shows communications over the secondary or second communication media (medium) 400.

During transmissions on the primary communication medium 300 between the first and second communications platforms 100 and 200, the second communication platform 200 will provide a series of information about where to look for a particular signal within an upcoming transmission on the secondary communication medium 400. In this case, for example, the second communication platform 200 may provide information about tuning and synch bits to the first communication platform 100 (201). Encrypted within the primary communication medium 300 is information about where to look on the secondary communication medium's 400 band in order to retrieve the proper "Challenge" question. Encoding could include one of the following methods: a) varied preamble pattern (e.g., tone), b) varied sync byte(s); and c) varied frequency. It is to be understood that these encodings are merely exemplary, and thus, the present invention is not limited thereto.

The second communication platform 200 transmits a start "Time of Process" clock to the first communication platform 100 via the secondary communication medium 400 (202). The second communication platform 200 then transmits the "Challenge" question obfuscated by cryptographically random noise (203). For example, the "Challenge" question obfuscated by cryptographically random noise may be sent over the same band. This noise may include transmissions of random data with the following encodings changed; a) varied preamble pattern (e.g., tone), b) varied sync byte(s); and c) varied frequency. It is to be understood that these encoding changes are merely exemplary, and thus, the present invention is not limited thereto.

The first communication platform 100 processes the "Challenge" question (204). This processing may take approximately $10^4$ nanoseconds. It is to be understood that this processing time is merely exemplary, and thus, the present invention is not limited thereto. The "Challenge" question is obtained by monitoring the correct frequency on the secondary communication medium 400 based on the information received in (201). The "Response" answer is then encrypted and returned with priority to the second communication platform 200 along the primary communication medium 300 (206). The full time of transmission of the signal (e.g., the "Challenge") along the secondary communication medium 400 to the receipt of the "Response" is calculated (207) and "Time of Process" is used to determine the likelihood that an intermediary is attempting to relay the signal.

Figure 2B:
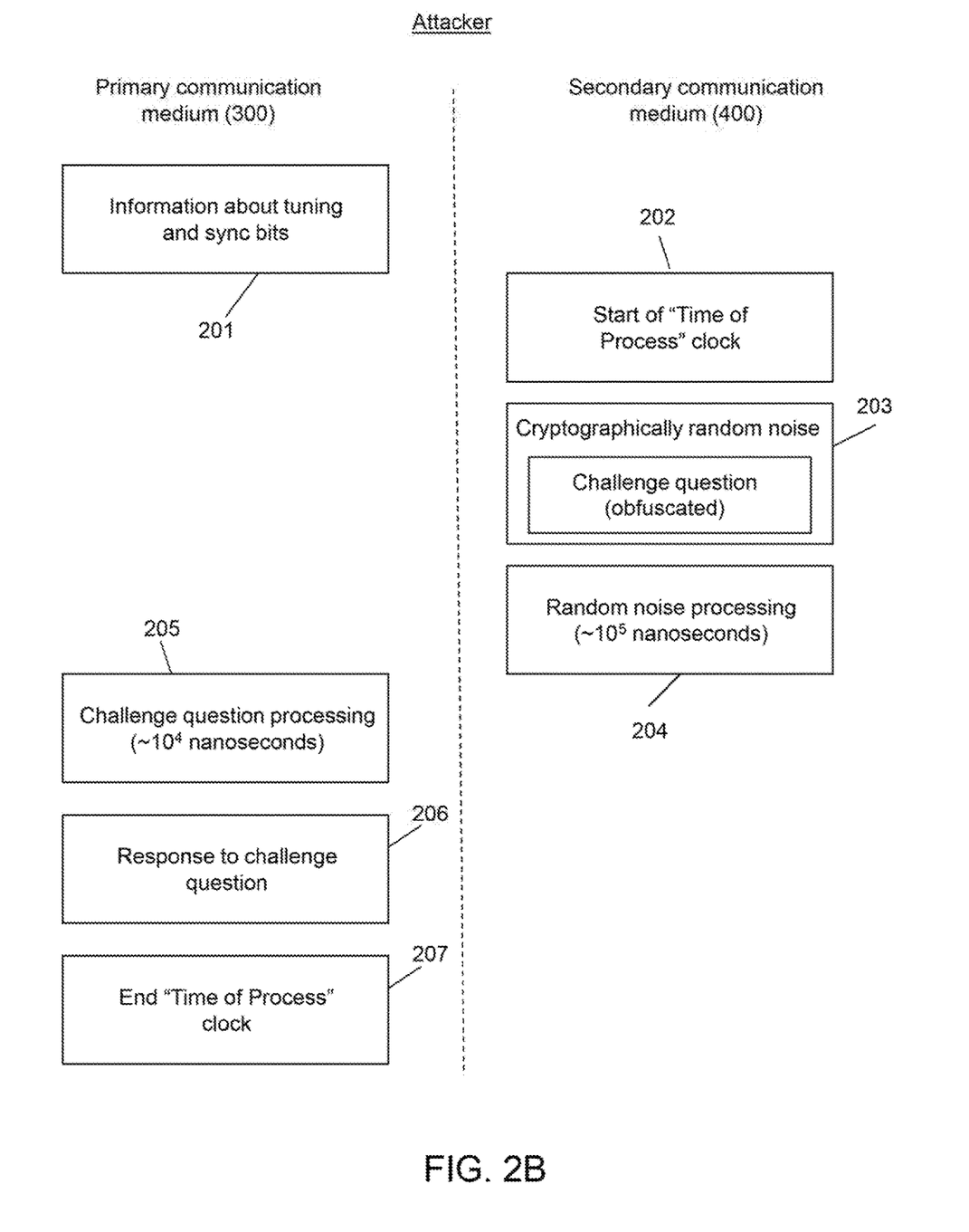
FIG. 2B is a workflow diagram of an attacker.

FIG. 2B is a workflow diagram of an attacker. The workflow of FIG. 2B is the same as the workflow of FIG. 2A except for (204). In 204, the attacker has to find a valid signal/medium to find the "Challenge" within the cryptographically random noise. This requires spending time (e.g., approximate $10^5$ nanoseconds) to process the random noise.

It is to be understood that the attacker processing time is merely exemplary, and thus, the present invention is not limited thereto. The attacker's processing time, however, will extend the "Time of Process," assuming the attacker successfully decomposes the "Challenge" question. Since the "Time of Process" is extended by the hack, the microlocation system 201 will determine that the signal was intercepted and consequently the intercepted signal will be ignored.

For example, the microlocation system 201 may determine that the relay attack has occurred when the time elapsed from when the start clock began to when the response is received at the second communication platform 200 (and time of process clock stops) exceeds a predetermined threshold. The microlocation system 201 may also determine that the relay attack has not occurred when the time elapsed from when the start clock began to when the response is received at the second communication platform 200 is below the predetermined threshold.

An example implementation of the present invention will now be discussed.

A Bluetooth connected smartphone may be in communication with a vehicle equipped with a microlocation system. When the phone makes any of the following transmissions, the microlocation system looks to see if the phone has been recently verified as sufficiently close to the vehicle. The transmission may include, after a microlocation algorithm calculates that the phone is close enough to the vehicle to initiate an unlock command: a) the "Unlock" command is sent; b) the "Enable Start" command is sent; c) the "Open Trunk" command is sent; or d) the "Open Frunk" command is sent. If the smartphone has been recently verified as sufficiently close to the vehicle, no further action is necessary. If the smartphone has not been recently verified as sufficiently close, the microlocation system begins the verification routine according to an exemplary embodiment of the present invention.

For example, the microlocation system will send a signal along the encrypted BLE channel, specifying a frequency and timing. This signal, while repeatable, is not visible to an attacker, thereby removing their ability to read the contents of the signal. The microlocation system then emits a number of signals from a WiFi antenna in the 5 GHz range. These signals are visible to the phone via its WiFi receiver antenna.

The phone receives these signals and interprets them via a cryptographically secured algorithm, utilizing the frequency and tinting information it received to hone in on the applicable information. The phone takes this output and embeds it into a specific response message. For example, the phone may embed the interpretation of the frequency and timing information into the response. The vehicle will check this information and makes sure it matches what was sent. If no signals were received, a default message is instead embedded into the response.

If the microlocation system can receive an appropriately interpreted response, it will begin calculating the loop time, e.g., the time from its first series of signals in the 5 GHz range until the time it received the response. Comparing this to a processing loop time by distance, the microlocation system will be able to determine the likelihood of whether the signal was intercepted and rebroadcast or not. For example, with regard to a speed/distance/time calculation, if the microlocation system knows two of the three variables, the third variable can be determined. Since time (via 'Time of Process') and approximate speed are known, the system can determine an actual distance and compare it to the microlocation algorithm's output. If the microlocation zone and time by distance does not add up, it is likely the signal was intercepted and rebroadcast.

Figure 3:
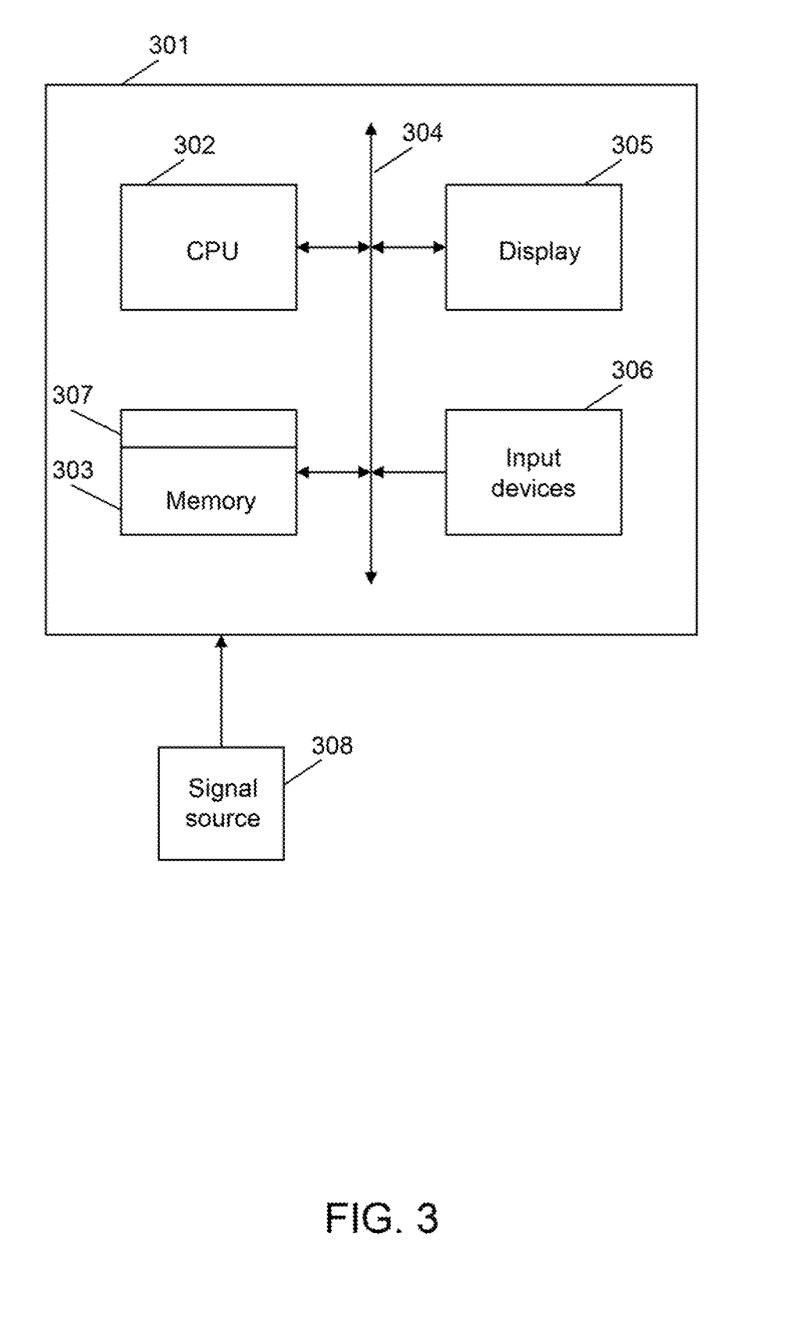
FIG. 3 illustrates a computer system in which an exemplary embodiment of the present invention may be implemented.

Referring now to FIG. 3, according to an exemplary embodiment of the present invention, a computer system 301 can comprise, inter alia, a central processing unit (CPU) 302, a memory 303 and an input/output (I/O) interface 304. The computer system 301 is generally coupled through the I/O interface 304 to a display 305 and various input devices 306 such as a mouse and keyboard. The support circuits can include circuits such as cache, power supplies, clock circuits, and a communications bus. The memory 303 can include random access memory (RAM), read only memory (ROM), disk drive, tape drive, etc., or a combination thereof. Exemplary embodiments of present invention may be implemented as a routine 307 stored in memory 303 (e.g., a non-transitory computer-readable storage medium) and executed by the CPU 302 to process the signal from a signal source 308. As such, the computer system 301 is a general-purpose computer system that becomes a specific purpose computer system when executing the routine 307 of the present invention.

The computer system 301 also includes an operating system and micro-instruction code. The various processes and functions described herein may either be part of the micro-instruction code or part of the application program (or a combination thereof) which is executed via the operating system. In addition, various other peripheral devices may be connected to the computer system 301 such as an additional data storage device and a printing device. Aspects of the computer system 301 are applicable to the smartphone (100) and the control module of the microlocation system (201), for example.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium, A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a RAM, a ROM, an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such s Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article or manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be execrated substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

What is claimed is:

1. A method for detecting relay attacks between two a vehicle and a mobile communication device, comprising:
    transmitting a vehicle control command from the mobile communication device to the vehicle via a first communication medium;
    receiving, at the mobile communication device, a first signal sent via a first communication medium from the vehicle responsive to the vehicle control command, the first signal being encrypted and including information about where to retrieve a challenge;
    receiving, at the mobile communication device, a second signal sent via a second communication medium different than the first communication medium from the vehicle, wherein the second signal is a start clock;
    receiving, at the mobile communication device, a third signal sent via the second communication medium from the vehicle, the third signal including the challenge;
    outputting, from the mobile communication device, a response to the challenge via the first communication medium to the vehicle, wherein the response is encrypted;

determining, at the vehicle, whether a relay attack has occurred based on a time elapsed from when the start clock began to when the response is received at the vehicle;

and responsive to determining that a relay attack has not occurred, performing a vehicle control operation at the vehicle associated with the vehicle control command.

2. The method of claim 1, wherein the vehicle determines that the relay attack has occurred when the time elapsed from when the start clock began to when the response is received at the vehicle exceeds a predetermined threshold.

3. The method of claim 1, wherein the vehicle determines that the relay attack has not occurred when the time elapsed from when the start clock began to when the response is received at the vehicle is below a predetermined threshold.

4. The method of claim 1, wherein the information about where to retrieve the challenge includes a frequency of the challenge.

5. The method of claim 1, wherein the third signal is transmitted with cryptographically random noise.

6. The method of claim 1, wherein the vehicle is a vehicle equipped with a microlocation system.

7. The method of claim 6, wherein the mobile communication device is a smartphone or a key fob.

8. The method of claim 1, wherein the first communication medium comprises Bluetooth or WiFi.

9. The method of claim 1, wherein the second communication medium comprises ultra-wideband.

10. A method for detecting relay attacks between a vehicle and a mobile communication device, comprising:

transmitting a vehicle control command from the mobile communication device to the vehicle via a first communication medium;

receiving, at the mobile communication device, a first signal sent via a first communication medium from the vehicle responsive to the vehicle control command, the first signal including information about a challenge;

receiving, at the mobile communication device, a second signal sent via a second communication medium different than the first communication medium from the vehicle, wherein the second signal is a start clock;

receiving, at the mobile communication device, a third signal sent via the second communication medium from the vehicle, the third signal including the challenge;

outputting, from the mobile communication device, a response to the challenge via the first communication medium to the vehicle;

determining, at the vehicle, whether a relay attack has occurred based on a time elapsed from when the start clock began to when the response is received at the vehicle; and responsive to determining that a relay attack has not occurred, performing a vehicle control operation at the vehicle associated with the vehicle control command.

11. The method of claim 10, wherein the vehicle determines that the relay attack has occurred when the time elapsed from when the start clock began to when the response is received at the vehicle exceeds a threshold.

12. The method of claim 10, wherein when it is determined that the relay attack has occurred, the vehicle ignores the response sent from the first communication device.

13. The method of claim 10, wherein the first and second communication mediums are wireless communication mediums.

* * * * *

UNITED STATES PATENT AND TRADEMARK OFFICE
CERTIFICATE OF CORRECTION

| | |
|---|---|
| PATENT NO. | : 11,483,320 B2 |
| APPLICATION NO. | : 16/826612 |
| DATED | : October 25, 2022 |
| INVENTOR(S) | : Santavicca et al. |

It is certified that error appears in the above-identified patent and that said Letters Patent is hereby corrected as shown below:

In the Claims

Column 8, Line 46    Delete: "two"

Signed and Sealed this
Thirteenth Day of December, 2022

Katherine Kelly Vidal
*Director of the United States Patent and Trademark Office*